Patented Apr. 28, 1931

1,803,178

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

EXPANSION-JOINT MATERIAL

No Drawing. Application filed December 7, 1925. Serial No. 73,929.

The present invention relates to mixtures of clays and earthy materials with oils, in which some element is incorporated to provide an elastic character, and pertains particularly to expansion joint materials used in building and paving construction.

My invention relates to finely pulverized clay, fuller's earth, asbestos floats, or a mixture of said or like materials with such materials as ground lime stone, brick dust, mineral pigments, and similar materials.

The materials mentioned constitute the base, and with these materials are mixed oils such as refined mineral oils, preferably those which are white in color and which would not destroy the natural colors of the earthy materials, vegetable oils, preferably of the non-drying variety, although many semi-drying oils may be utilized I prefer these oils, however, which have no heavy residue which would destroy the coloring matter in the natural fillers. Fish oils may be used or animal oils, which are properly treated may be utilized for the purpose as described.

The admixture of the oil to the base imparts a plastic characteristic, but does not necessarily impart thereto a tenacious elastic characteristic, and in order that such elastic characteristic may be imparted I use such materials as latex in an uncoagulated state, polymerized oils, waterproof glues, or other similar viscous substances which are inherently waterproof or treated to become waterproof. All these substances are viscous and have an affinity for the earthy materials, and together with the raw oil impart a more elastic condition due to a peculiar cohesive tendency of the molecules of these substances. To these materials, fibrous material may be added to give strength and form an additional binding means.

I prefer to utilize, in combination with these materials, white oils rather than oils which have discoloration, and this also holds true of the gelatinous or viscous substances, the object being to retain the earthy materials in their natural color or any combination of color which their intermixture may cause.

This invention relates to various types of expansion joint materials, which are more or less closely related, for instance the earthy materials may be mixed with oil and with the uncoagulated latex to provide a satisfactory material for certain purposes. When preparing this mixture I would prefer to use from seventy (70) to ninety-five (95) per cent of clay, from four (4) to twenty-five (25) per cent of oil and from one (1) to five (5) per cent uncoagulated latex. Other materials such as, waterproof glue, polymerized oil, and other like substances may be substituted for the latex, and darker oils may take the place of prepared oils, and the other earthy materials specified may take the place of the clay as the base. Likewise I may find that other mixtures may prove entirely satisfactory, and I, therefore, do not wish to be confined to these proportions or the specific materials named, excepting that should bituminous oils be utilized I would not use such oils as are of black color or petroleum residues, unless white in color or very close to white. Tarry substances should not be used unless they are non-drying oils refined from coal tar.

Another form of this invention may consist of clay approximating sixty-five (65) to ninety (90) per cent, oil five (5) to twenty-five (25) per cent, uncoagulated latex one (1) to five (5) per cent, and polymerized oil four (4) to five (5) per cent. These proportions likewise may be varied and substitute materials in their classes named substituted for those disclosed. The percentages may be increased and further developments may show desirable percentages other than those disclosed, and I, therefore, do not wish to be limited to this specific combination.

Likewise another form which may be used comprises a combination of clay with oil to which is added the polymerized oil or gelatinous substance, eliminating the latex. The preferred proportions are approximately seventy (70) to ninety (90) per cent clay, five (5) to twenty-five (25) per cent oil and five (5) per cent polymerized oil or viscous substances. It is understood that the base material, when clay should be mentioned, may be any of the earthy materials mentioned as usable in place of clay, or that mixtures of the earthy materials may be substituted for the clay where the natural color is desired, but if a blended color is to be employed then any of the earthy materials may be mixed with the pigments to produce the desired color. These proportions, of course, may be varied according to what color is desired.

The material is mixed in suitable mixers provided for the purpose, and it is preferable that the earthy materials be ground fine or pulverized before mixing in the other ingredients. It is preferable that all the ingredients be intermixed before any fibrous material is added, where a fibrous material is to be employed. Likewise this fibrous material may consist of animal hair, vegetable fibre, either finely divided or bulk fibrous material, and such fibrous material may include any vegetable matter in its various forms insofar as a fibrous tissue is desired. Animal fibres or flexible crystals also may be employed, as a strengthening means. The latter are preferably mixed after the other ingredients are compounded, and after the entire mass is suitably mixed the material is preferably rolled into sheets by machinery provided for the purpose and then cut into strips of various size for expansion joint purposes.

It may be desirable to cause a flow in these materials, when heated. To provide this characteristic it may be desirable to add a suitable ingredient such as paraffine wax, a resinous material, or one of the various light colored pitches, such as, stearine, for instance, or other similar pitch which causes the material to flow when heated. Such materials to be added in sufficient proportions so that when heated the mixture described can be flowed into a crevice, or flowed therein with suitable means in a plastic, pliable condition.

There have been no materials of this kind provided which would be suitable for expansion purposes, and the combination of the specified materials, either singly or in combination, may be used for various structural purposes, especially in buildings, floors of buildings, and in pavements, where it is desired to use this expansion material for the purpose of matching the color of the ingredients used in the floor or pavement, and especially where a different colored plastic material can be used for marking strips, signal strips, and the like.

I claim:

1. As an article of manufacture, expansion joint material comprising a mixture of a preponderant proportion of earthy substance, an oil to make said substance plastic, and uncoagulated latex.

2. As an article of manufacture, expansion joint material consisting of a preponderant proportion of colored earthy material, an oil to make said mass plastic, and uncoagulated latex.

3. As an article of manufacture, expansion joint material consisting of a preponderant proportion of earthy material, an oil mixed with said earthy material to make it plastic and waterproof, and a viscous substance insoluble in water.

4. As a new article of manufacture, expansion joint material formed by mixing a preponderant proportion of colored earthy material, an oil to make the same plastic and waterproof, and a viscous substance insoluble in water.

5. As a new article of manufacture, an expansion joint material formed by mixing a preponderant proportion of earthy material, an oil to make said earthy material plastic and waterproof, uncoagulated latex and fibrous material as described.

6. As a new article of manufacture, an expansion joint material formed by mixing a preponderant proportion of earthy substances with an oil to make said earthy substances plastic and waterproof, a viscous substance insoluble in water and fibrous material.

7. As a new article of manufacture, an expansion joint material formed by mixing a preponderant proportion of earthy materials, an oil to make said earthy materials plastic and waterproof, a viscous substance insoluble in water, fibrous materials as described, and a heat responsive flow producing element.

8. An expansion joint material comprising a preponderant proportion of finely divided earthy material, an oil and a waterproof adhesive material homogeneously mixed together, the adhesive material being interspersed throughout the material to cause adjacent particles thereof to adhere.

9. An expansion joint material comprising a preponderant proportion of finely divided earthy material, an oil and uncoagulated latex homogeneously intermixed throughout the earthy material to cause adjacent particles to adhere and form a plastic yet resilient mass.

10. An expansion joint material comprising a preponderant proportion of pulverized colored earthy material, a nondrying oil and a resilient water insoluble adhesive binder material homogeneously intermixed throughout the earthy material to cause adjacent particles to adhere and form a plastic yet resilient mass.

11. The process of making a plastic elastic composition material characterized by preparing a plastic mass of earthy material and oil, incorporating uncoagulated latex therein, and mixing the ingredients to disperse the latex throughout the mass to give same an elastic character.

12. The process of making a plastic elastic expansion joint composition material characterized by preparing a plastic mass of earthy material and oil, incorporating a viscous substance therein, and mixing the ingredients to disperse said viscous substance throughout the mass to give same as elastic character.

13. The process of making a plastic elastic expansion joint composition material characterized by preparing a plastic mass of earthy material, oil and fibrous material, incorporating uncoagulated latex therein, and mixing the ingredients to disperse the latex throughout the mass to give same an elastic character.

14. The process of making a plastic elastic expansion joint composition material characterized by preparing a plastic mass of earthy material, oil and fibrous material, incorporating a viscous substance therein, and mixing the ingredients to disperse the viscous substance throughout the mass to give same an elastic character.

Signed at Chicago, Illinois, this 27th day of November, 1925.

ALBERT C. FISCHER.